United States Patent [19]

Largent, deceased et al.

[11] 4,378,123
[45] Mar. 29, 1983

[54] SEAL MEANS FOR UNDERWATER CONNECTORS

[76] Inventors: James O. Largent, deceased, late of Houston, Tex.; by Jo L. Largent, administratrix, 8803 Bellair, Houston, Tex. 77036

[21] Appl. No.: 176,858

[22] Filed: Aug. 11, 1980

[51] Int. Cl.³ .............................................. F16L 35/00
[52] U.S. Cl. ..................................... 285/24; 285/108; 285/131; 285/379; 285/DIG. 1
[58] Field of Search .................. 285/24, 379, 351, 352, 285/108, 131, 68, 69, 336, 349, DIG. 1; 277/180, 189

[56] References Cited

U.S. PATENT DOCUMENTS

| | | | |
|---|---|---|---|
| 379,798 | 3/1888 | Magee | 285/379 |
| 744,506 | 11/1903 | Dixon | 285/379 X |
| 837,538 | 12/1906 | Biery et al. | 285/322.2 X |
| 1,832,435 | 11/1931 | Voorhies et al. | 285/68 X |
| 3,215,442 | 11/1965 | Papenguth | 277/180 |
| 3,701,549 | 10/1972 | Koomey | 285/351 |
| 3,869,132 | 3/1975 | Taylor et al. | 277/180 |
| 4,189,172 | 2/1980 | Perrin | 285/236 |

FOREIGN PATENT DOCUMENTS 1441207 6/1976 United Kingdom ................ 285/349

*Primary Examiner*—Dave W. Arola
*Attorney, Agent, or Firm*—Bertram H. Mann

[57] ABSTRACT

Seal means for communicating, aligned passages in telescoping insert and socket parts of an underwater connector for hydraulic lines. A seal means carrier, interposed between the parts, has a passageway aligned with and connecting the mentioned passages. An annular resilient seal ring fits snugly within and about the passageway and has opposite edge portions which, in the assembly of the connector, sealingly engage the surface portions of the insert and socket about said passages.

3 Claims, 3 Drawing Figures

U.S. Patent  Mar. 29, 1983  Sheet 2 of 2  4,378,123
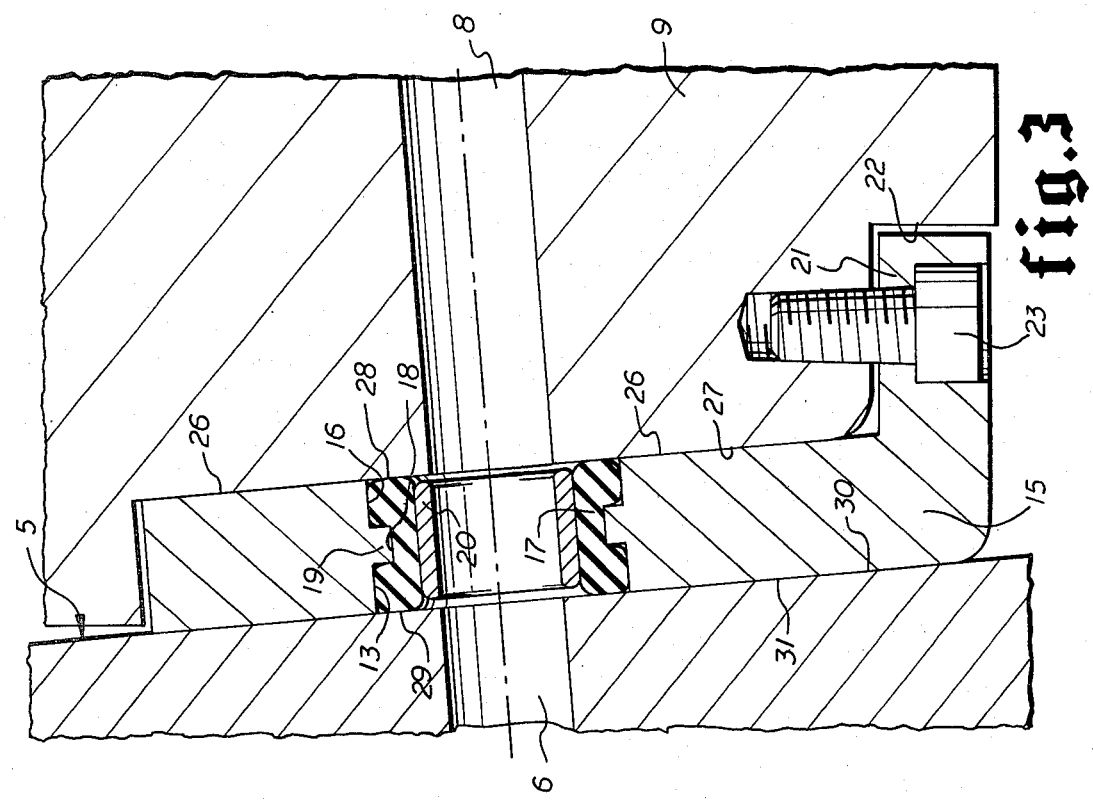
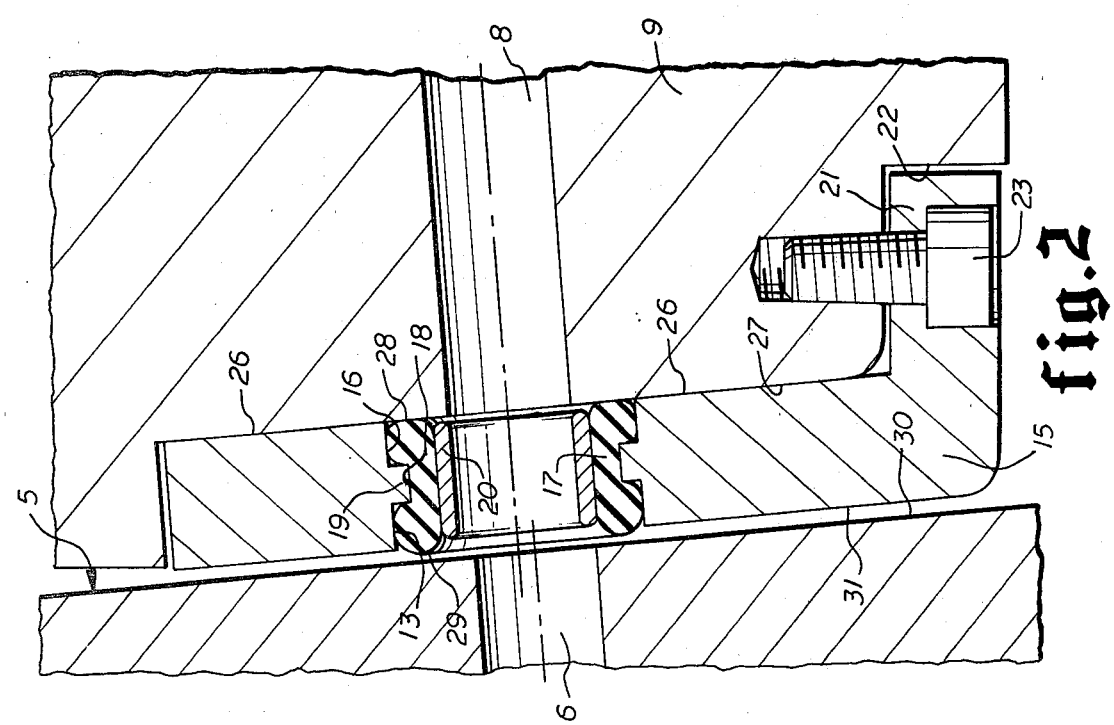

SEAL MEANS FOR UNDERWATER CONNECTORS

BACKGROUND OF THE INVENTION

U.S. Pat. No. 3,701,549 discloses a form of underwater connector having interfitting, telescoping receptacle and "stinger" parts for connecting hydraulic control lines with submerged, controlled devices. Each pair of mating passages in the receptacle and "stinger" are sealingly connected by a resilient seal ring secured in the end of the "stinger" passage by a threaded retainer and optionally provided with an embedded reinforcing ring for high pressure situations. The retainer and reinforcement are necessary to prevent distortion of the seal and blowing out of the seal ring as the assembly is separated.

SUMMARY OF PRESENT INVENTION

An object of the present invention is to provide a more effective, stable, and durable, yet more economical seal for interconnected passages.

Another object is to eliminate the necessity of providing the seal with separate retainer and reinforcement means.

Another object is to provide a passage seal with greater tolerance in assembly.

These objects and others hereafter appearing are attained by the present disclosure in which an underwater quick connector has interfitting socket and insert parts with mating pairs of passages and seal means comprising a seal carrier secured between the aligned intercommunicating passage ends. The seal carrier has a passageway through which the hydraulic fluid is transmitted between the parts. A special resilient, annular, double-lobed seal is snugly received in the connecting passageway and has edge portions which, respectively, sealingly engage the facing surface portions of the connector socket and insert parts about the aligned fluid passages. A guide sleeve within the double seal stabilizes the assembly without separate threaded or embedded retainer and reinforcement elements. Internal pressures act oppositely against the edges of the resilient seal to prevent leakage between the socket and insert parts and to prevent expulsion of the seal from the carrier passageway.

BRIEF DESCRIPTION OF THE DRAWINGS

In the accompanying drawings,

FIG. 2 is an enlarged sectional view showing portions of the socket and insert parts of the connector slightly separated.

FIG. 3 is a view similar to FIG. 2, but with the socket and insert parts fully engaged.

DETAIL DESCRIPTION OF THE DRAWINGS

Figure 1:
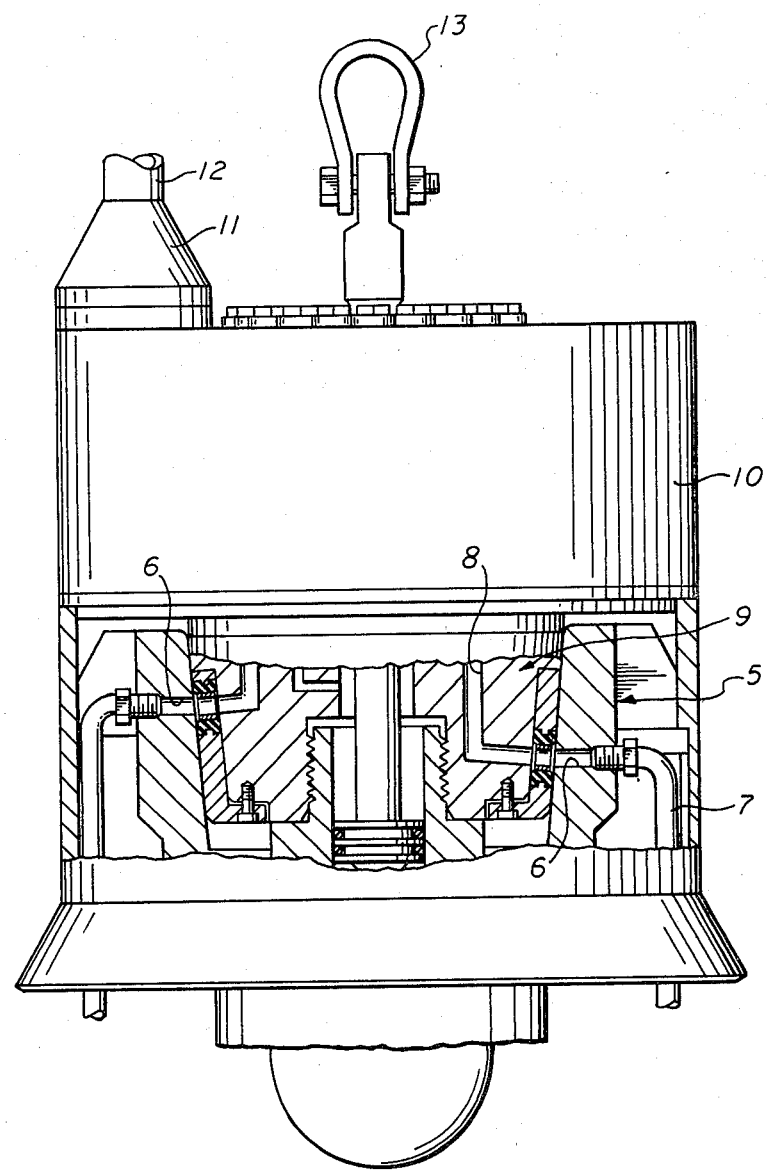
FIG. 1 is an elevation partly broken away and sectioned, showing an underwater hydraulic connector with interfitting socket and insert parts having mating passages sealingly connected in accordance with the present invention.

FIG. 1 shows a form of underwater connector of the type herein involved, including the outer socket part 5 having a multiplicity of radial passages 6 connected by piping 7 to controlled devices (not shown). Passages 6, in the socket (FIG. 2), communicate inwardly with ducts 8 in inner insert part 9 and extending through superstructure 10, coupling 11, and a bundle of hoses 12 to a surface control position. An eye 13 serves for lowering and retrieving the connector as a whole or the insert part thereof. Suitable means, including a shaft 14, are provided for latching the insert and socket parts together when assembled.

Encompassing the lower portion of the insert part 9 is a seal carrier sleeve 15 having a plurality of passageways 16 which, in the operative assembly, are axially aligned with and interconnect ducts 8 and passages 6 in the insert and socket parts respectively. Snugly received in each passageway 16 is a two-lobed, annular, resilient seal 17 (only one seal means will be described) having a central peripheral recess 18 for receiving centering tongue 19 on the carrier. Within the seal 17 there is provided a metal guide sleeve 20 which will keep the seal from rolling during makeup. At the lower edge of the carrier sleeve there is an inturned flange 21 received in a rabbet groove 22 and bolted to the underside of insert 9, as at 23.

FIG. 2 illustrates the seal configuration with the carrier inner surface 26 in firm engagement with the insert outer surface 27. The right hand edge 28 of the seal is sealingly compressed against the insert wall about the end of duct 8 so as to prevent leakage either way therepast. The free left hand edge or lobe 29 of the seal is slightly bulged beyond the carrier. In FIG. 3, the insert 9, with carrier 15 attached, is seated within socket 5 with the confronting walls 30 and 31 engaged. The left hand edge 29 of the seal is now sealingly compressed against the confronting socket wall 31 to prevent leakage therepast in either direction.

OPERATION

The seal carrier with sealing means elements 17, 20 installed, is initially firmly applied and bolted to the insert at 23 with passageway 16 and duct 8 in register. The insert may then be dropped into the socket, which causes compression of the protruding outer seal edge, as against socket inner wall 30 about the end of corresponding socket passage 6. Hydraulic pressure in control duct 8 is transmitted through corresponding seal carrier passageway 16 and aligned socket passage 6 to a controlled device (not shown). At such time, that is, whenever carrier passageway 16 is pressured, substantially identical pressures will be applied around guide sleeve 20 and against the opposite edges or lobes of the double-lobed seal 17. The resulting firm contacts of the seal edges 28, 29 with the opposing insert and socket walls 27 and 30 as explained, will prevent leakage around the seal carrier even during the brief period as the contact between the insert and socket walls is broken and before the pressure in the carrier passageway is relieved, as in FIG. 2. Significantly, this balancing of axial forces on the annular seal 17 will prevent expulsion of the seal and guide sleeve 20 from the carrier passageway, so that no special retainer means is necessary. Other important advantages result from elimination of the special retainer and reinforcement elements of U.S. Pat. No. 3,701,549 and their problems of greater cost, difficulty of accurate assembly, and reduced tolerances.

In practice, the insert and socket will be provided with a multiplicity of the mating ducts 8 and passages 6, as in FIG. 1, and guide means for insuring intercommunication between corresponding passages and ducts. Carrier 15 will have passageways properly positioned to connect some or all of the socket and insert pairs.

Where an insert duct will not be used, the aligned carrier passageway may be blanked by plugging. The novel seal means may be otherwise utilized as with different types of connectors. The invention may be modified in various ways as will occur to those skilled in the art and the exclusive use of all modifications as come within the scope of the appended claims is contemplated.

What is claimed is:

1. The combination connector including separable interfitting socket and insert parts with abutting walls and intercommunicating pressurized fluid ducts extending respectively through said parts and means to sealingly interconnect said ducts, coacting means between said socket and insert parts for aligning the fluid ducts in the socket with those of the insert part, said sealing means comprising a seal carrier between said abutting walls, said seal carrier being provided with inner and outer walls and a passage in said carrier extending through said inner and outer walls interconnecting said ducts, an annular seal sealingly fitting in and about said passage and extending beyond said inner and outer walls, and a guide sleeve snugly fitting within said seal and terminating at each end thereof short of said inner and outer walls, and coacting means between said seal and seal carrier for positioning said seal therein and means for mounting said seal carrier on said insert part so that said seal will be in alignment with the duct in the insert part, there being sufficient clearance between the adjacent edges of said guide sleeve and said seal for transmitting fluid pressures inside said collar oppositely against the edges of said seal for balancing the pressure against said seal and preventing expulsion of said seal from said passage when said socket and insert are initially separated.

2. The combination described in claim 1 in which said socket and insert are frusto-conically shaped and said carrier has a frusto-conical wall.

3. The combination described in claim 1 in which said socket, insert, and carrier comprise an underwater quick connector for pressurized fluid lines.

* * * * *